Feb. 19, 1935.  D. K. DEAN ET AL  1,991,733
METHOD AND APPARATUS FOR COOLING LIQUID
Filed Dec. 29, 1931
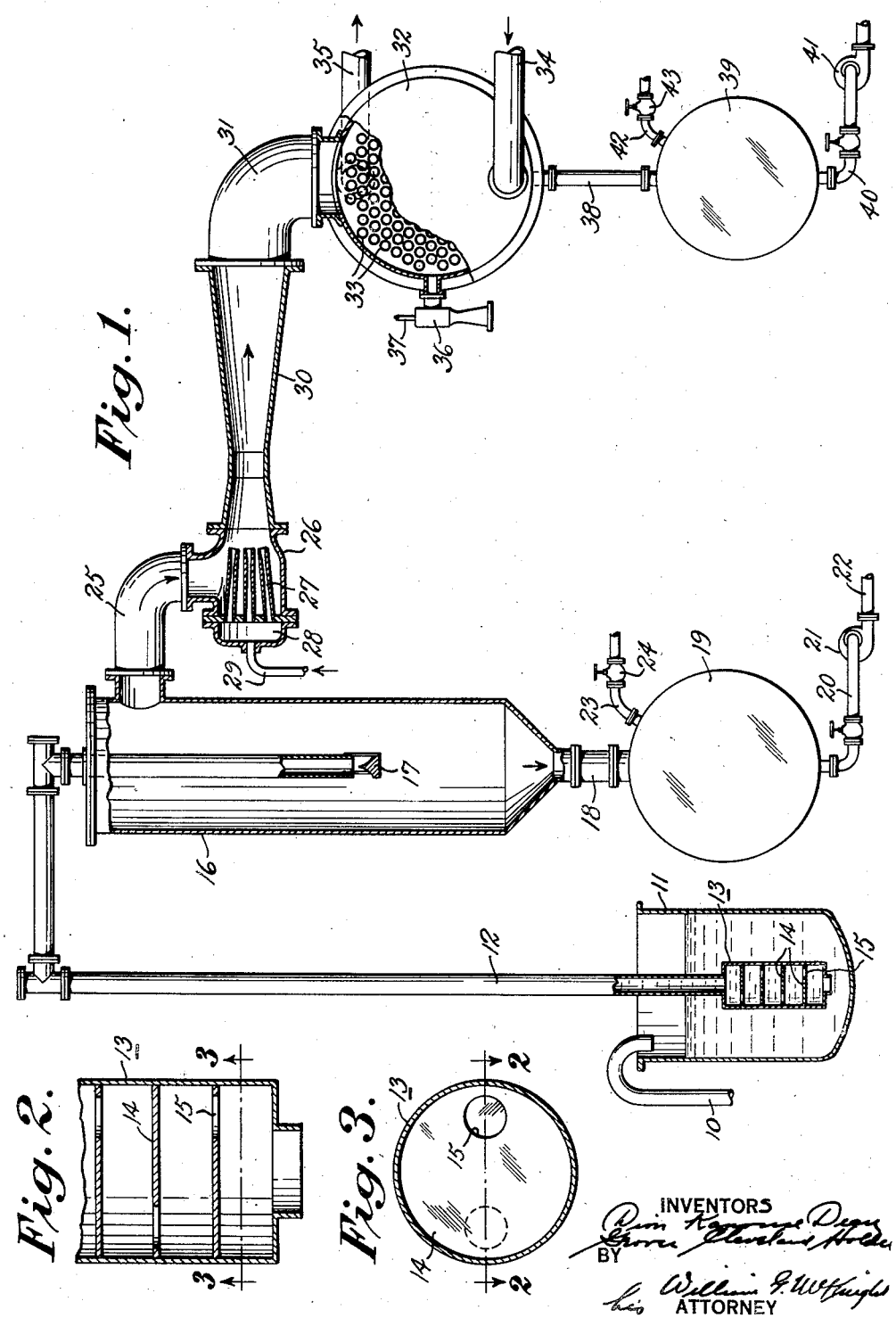

Patented Feb. 19, 1935

1,991,733

UNITED STATES PATENT OFFICE 1,991,733

METHOD AND APPARATUS FOR COOLING LIQUID

Dion Kanouse Dean, Rahway, and Grover Cleveland Holder, Elizabeth, N. J., assignors to Foster Wheeler Corporation, New York, N. Y., a corporation of New York Application December 29, 1931, Serial No. 583,674

12 Claims. (Cl. 62—177)

In treating milk, refrigeration plays an important part. Cooling milk is generally accomplished by surface cooling. We have devised a process which employs flash evaporation of the milk itself. This has distinct advantages in the efficiency of cooling and the quality is improved inasmuch as certain odors are removed by this process. However, flashing of milk by a rapid drop in pressure through an orifice is disadvantageous because the atomization resulting from the large and sudden pressure drop through a single orifice so affects the milk as to retard or prevent the subsequent separation of cream from the milk. We have devised a method and apparatus wherein there is a gradual drop in pressure without substantial vaporization and subsequent vaporization at low pressure without the disadvantageous effect of atomization resulting from a sudden large pressure drop. Thus we obtain quick cooling without atomization.

In accordance with our invention, a gradual reduction in the pressure of the milk is obtained either by passing it through a plurality of comparatively large orifices in series or by passing it upwardly through a barometric leg or by a combination of both of these methods. In this manner atomization of the milk is prevented and cream may be readily separated from milk cooled in this manner.

While our invention is particularly well suited for the cooling of milk, the same advantages pertain with respect to the cooling of any emulsion or other liquid upon which atomization exerts a detrimental effect.

Our invention will be apparent from the following description considered in connection with the accompanying drawing which forms a part of this specification and on which:

Fig. 1 is a view, chiefly in cross-section, of a preferred embodiment of an apparatus in accordance with our invention;

Fig. 2 is an enlarged cross-sectional view of a portion of a pressure reducing device, shown in Fig. 1 and is taken on the line 2—2 of Fig. 3; and Fig. 3 is a cross-sectional view taken on the line 3—3 of Fig. 2.

Referring more particularly to Fig. 1, reference character 10 designates a conduit which discharges milk into a container 11. Container 11 may be under atmospheric pressure. A conduit 12 extends from near the bottom of container 11 upwardly. The lower part of conduit 12 comprises a device for gradually reducing the pressure of fluid flowing therethrough, designated generally by reference character 13. Within the pressure reducing device 13 there is located a plurality of discs or plates 14, each having an orifice 15 therethrough. Orifices 15 are of sufficient area so that liquid flowing therethrough will not be atomized. Discs 14 may advantageously be so arranged that the orifices 15 in adjacent discs are not in alignment.

Conduit 12 extends upwardly from container 11 and thence within a flash chamber 16. The discharge end of conduit 12 within chamber 16 is provided with a distributor 17. A conduit 18 connects the lower part of chamber 16 with a receiving tank 19. A conduit 20 connects the bottom of tank 19 with a pump 21 which discharges milk through a conduit 22 to storage or to any other desired place. A vent pipe 23 provided with a valve 24 is connected to the upper part of tank 19.

A conduit 25 connects the upper part of flash chamber 16 with the intake of a thermo-compressor 26. Thermo-compressor 26 is provided with a series of nozzles 27 connected to a chamber 28 which is supplied with motivating fluid, such as steam, through a conduit 29. Thermo-compressor 26 is provided with a throat 30 in the form of a Venturi tube. The end of throat 30 is connected by means of a conduit 31 to the steam space of a water tube condenser 32.

Condenser 32 is provided with a series of water tubes 33 which are supplied with condensing water through a conduit 34 and discharge this water through a conduit 35. A steam jet air pump 36, which is similar to, but smaller than, thermo-compressor 26 has its intake connected to the steam space of condenser 32 and serves to remove air and other non-condensable gases. Steam is supplied to pump 36 through a conduit 37. A conduit 38 connects the lower part of condenser 32 with a condensate receiving tank 39. A conduit 40 connects the lower part of tank 39 with a condensate pump 41. A vent pipe 42 provided with a valve 43 is connected to the upper part of tank 39.

The operation of the above described device is as follows:

The milk, or other emulsion, is supplied to container 11 through conduit 10. This milk passes into the intake end of conduit 12 within container 11 and passes through orifices 15 in the discs 14 due to the existence of a high degree of vacuum within chamber 16, as will be subsequently explained. As the milk passes through each orifice it experiences a drop in pressure. The drop in pressure through any one orifice is comparatively small and the size of the orifice is sufficiently large so that atomization of the milk will not occur. The milk thence passes upwardly through conduit 12, the left hand portion of which, as viewed in Fig. 1, constitutes a barometric leg. The pressure of the milk in the upper part of this leg is less than in the lower part due to the hydrostatic head of liquid in the leg. This change in pressure through the orifices and through the hydrostatic head is gradual.

The milk under low pressure is discharged from the open end of conduit 12 within flash chamber 16 against distributor 17. Distributor 17 breaks the stream of milk up into a large number of small drops. Due to the high degree of vacuum existing within chamber 16, a small percentage of the milk is evaporated, the heat of vaporization being taken from the remaining unvaporized milk which is consequently cooled. The cooled milk passes through conduit 18 into receiving tank 19 and may be pumped through conduits 20 and 22 by means of pump 21 to storage under atmospheric pressure, or to any other desired place.

The cooling of the milk within flash chamber 16 takes place almost instantaneously, due to the almost instantaneous formation of vapor when the stream of milk is broken up into small drops by distributor 17.

Steam under pressure is delivered through conduit 29 to chamber 28 and issues in the form of jets from nozzles 27. These jets have a high velocity and produce a suction effect which draws vapor from chamber 16 through conduit 25, thus producing a high degree of vacuum in chamber 16. The steam discharged from nozzles 27 and the vapor drawn in through conduit 25 is discharged from thermo-compressor 26 through conduit 31 to condenser 32. In the condenser the vapor derived from the thermo-compressor and the milk is condensed to a liquid by the cooling action of the cooling water in tubes 33. A high degree of vacuum is maintained in condenser 32 due to this condensation and due to steam jet air pump 36 which removes air and other non-condensable gases from the condenser. The condensate passes through conduit 38 to tank 39, from which it may be removed by pump 41.

In the device shown the pressure of the milk is reduced from atmospheric to the pressure existing in chamber 16 by passing through orifices 15 and by passing upwardly through conduit 12 which forms a barometric leg. Obviously, the entire reduction in pressure could take place in a barometric leg if the height of such leg were sufficiently great. In the case of milk, which has a specific gravity of about 1, such a barometric leg would have to be almost 32 feet high. On the other hand, the entire reduction in pressure could be made to take place through a series of orifices if it were not desirable to have the intake end of conduit 12 at a lower level than its discharge end. In either of the above means of reducing the pressure of the milk, or in a combination of both of these means, it is apparent that the reduction in pressure takes place gradually and that no atomization of the milk occurs.

While we have shown and described one more or less specific embodiment of our invention, it is to be understood that this is merely for the purpose of illustration and that many modifications thereof may be made within the scope of our invention. For instance, instead of providing a barometric leg or a conduit having a plurality of orifices for the purpose of gradually reducing the pressure of the fluid, a conduit formed in any other manner so that a gradual reduction in the pressure of fluid flowing therethrough falls within its scope, which is to be limited only by the appended claims viewed in the light of the prior art.

What we claim is:

1. The method of cooling an emulsion which comprises reducing the pressure of the emulsion in a plurality of steps without substantial vaporization, vaporizing a portion of the emulsion at the reduced pressure, and supplying the heat of vaporization from the unvaporized portion of the emulsion.

2. Apparatus for cooling an emulsion comprising a flash chamber, means for producing a partial vacuum in said chamber, a conduit for conducting emulsion without substantial vaporization thereof into said chamber, and means providing a plurality of orifices in series in said conduit.

3. Apparatus for cooling an emulsion comprising a flash chamber, means for producing a partial vacuum in said chamber, a conduit for admitting emulsion into said chamber, and means providing a plurality of orifices in series in said conduit, the inlet end of said conduit being at a lower level than the discharge end.

4. Apparatus for cooling an emulsion comprising a flash chamber, means for producing a partial vacuum in said chamber, a conduit for admitting emulsion into said chamber, a container open to atmospheric pressure and located below the discharge end of said conduit, the inlet end of said conduit communicating with said container at a point below the top of said container, means providing a plurality of orifices in series in said conduit, and means for supplying emulsion to said container.

5. Apparatus for cooling an emulsion comprising a flash chamber, a thermo-compressor, means connecting the intake of said thermo-compressor with said flash chamber, a conduit for admitting emulsion into said flash chamber, and means comprising a plurality of orifices in said conduit for gradually reducing the pressure of the emulsion flowing therethrough.

6. The method of cooling milk which comprises gradually reducing the pressure of the milk without substantial vaporization, vaporizing a portion of the milk at the reduced pressure, and supplying the heat of vaporization from the unvaporized portion of the milk.

7. Apparatus for cooling milk comprising a flash chamber, means for producing partial vacuum in said chamber, a conduit for conducting milk from a point under substantially atmospheric pressure into said chamber, and means comprising a plurality of orifices in said conduit for gradually reducing the pressure of the milk flowing therethrough.

8. Apparatus for cooling milk comprising a flash chamber, a thermo-compressor, means connecting the intake of said thermo-compressor with said flash chamber, a conduit for admitting milk into said flash chamber, and means providing a plurality of orifices in series in said conduit for gradually reducing the pressure of the milk flowing therethrough.

9. The method of cooling an emulsion which comprises gradually reducing the pressure of the emulsion without substantial vaporization, vaporizing a portion of the emulsion at the reduced pressure, and supplying the heat of vaporization from the unvaporized portion of the emulsion.

10. The method of cooling an emulsion which comprises reducing the pressure of the emulsion in a plurality of steps without substantial vaporization, further reducing the pressure of the emulsion gradually without substantial vaporization, vaporizing a portion of the emulsion at the reduced pressure last mentioned, and supplying the heat of vaporization from the unvaporized portion of the emulsion.

11. The method of cooling milk which comprises reducing the pressure of the milk in a plurality of steps without substantial vaporization, further reducing the pressure of the milk gradually without substantial vaporization, vaporizing a portion of the milk at the reduced pressure last mentioned, and supplying the heat of vaporization from the unvaporized portion of the milk.

12. Apparatus for cooling milk comprising a flash chamber, means for producing a partial vacuum in said chamber, a conduit for conducting milk without substantial vaporization thereof into said chamber, and means providing a plurality of orifices in series in said conduit.

DION KANOUSE DEAN.
GROVER CLEVELAND HOLDER.